Sept. 19, 1950     C. FIELD     2,522,507
ICE-MAKING APPARATUS

Original Filed Aug. 30, 1946     2 Sheets—Sheet 1

INVENTOR.
CROSBY FIELD

Sept. 19, 1950          C. FIELD          2,522,507
ICE-MAKING APPARATUS
Original Filed Aug. 30, 1946          2 Sheets-Sheet 2
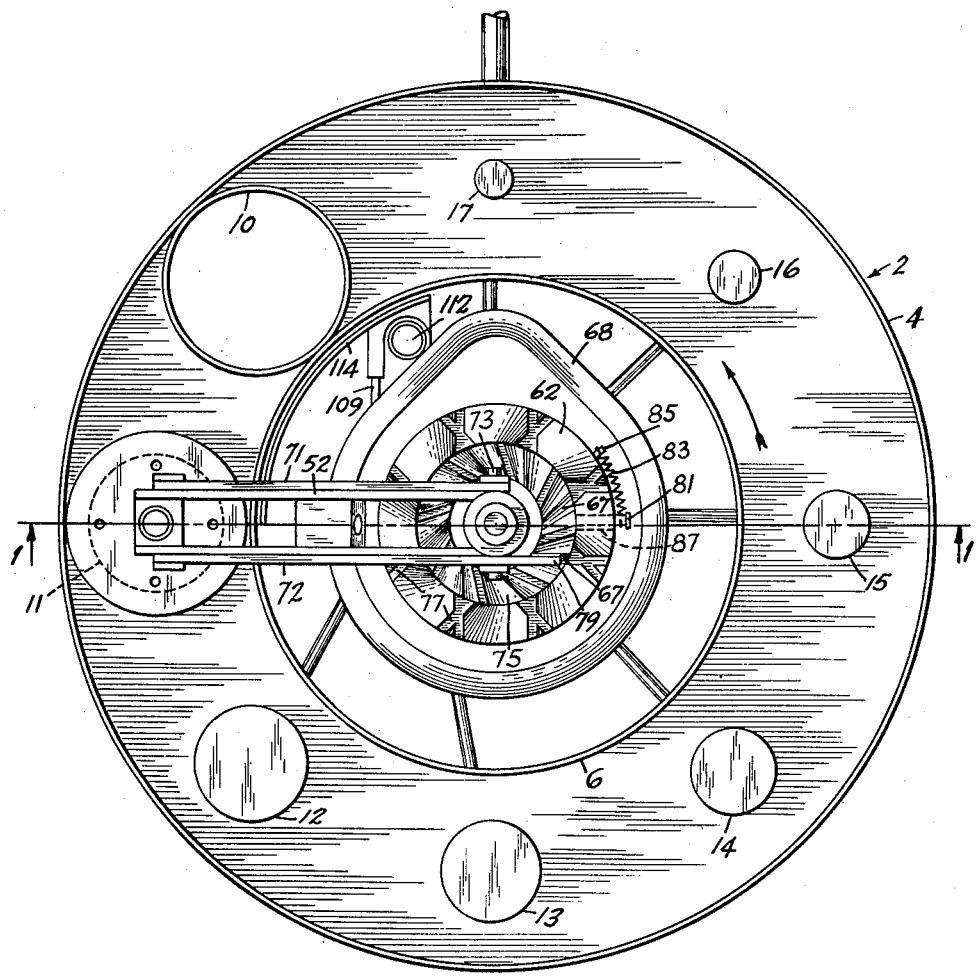
INVENTOR.
CROSBY FIELD Patented Sept. 19, 1950

2,522,507

UNITED STATES PATENT OFFICE 2,522,507

ICE-MAKING APPARATUS

Crosby Field, Brooklyn, N. Y., assignor to Flakice Corporation, Brooklyn, N. Y., a corporation of Delaware Original application August 30, 1946, Serial No. 693,994. Divided and this application April 5, 1949, Serial No. 85,532

6 Claims. (Cl. 62—106)

This invention relates to the congealing of liquids and, more particularly, to the making of ice by freezing laminae or layers into large pieces of more or less regular configurations.

An object of this invention is to provide for the congealing of liquids such as water, cream, fruit juices and the like in a thoroughly dependable and practical manner. A further object is to provide for the freezing of liquids to form layers or laminae which may be frozen together to form large pieces of ice. A further object is to provide automatic apparatus for carrying out the above of such character as to be readily adaptable to varying conditions of use. These and other objects will be in part obvious and in part pointed out below.

The invention accordingly consists in the features of construction, combinations of elements, arrangements of parts and in the several steps and relation and order of each of the same to one or more of the others, all as will be illustratively described herein, and the scope of the application of which will be indicated in the following claims.

In the drawings:

Figure 2 is a top plan view with parts broken away of the apparatus of Figure 1; and Figure 3 is a view on the line 3—3 of Figure 1.

Figure 1:
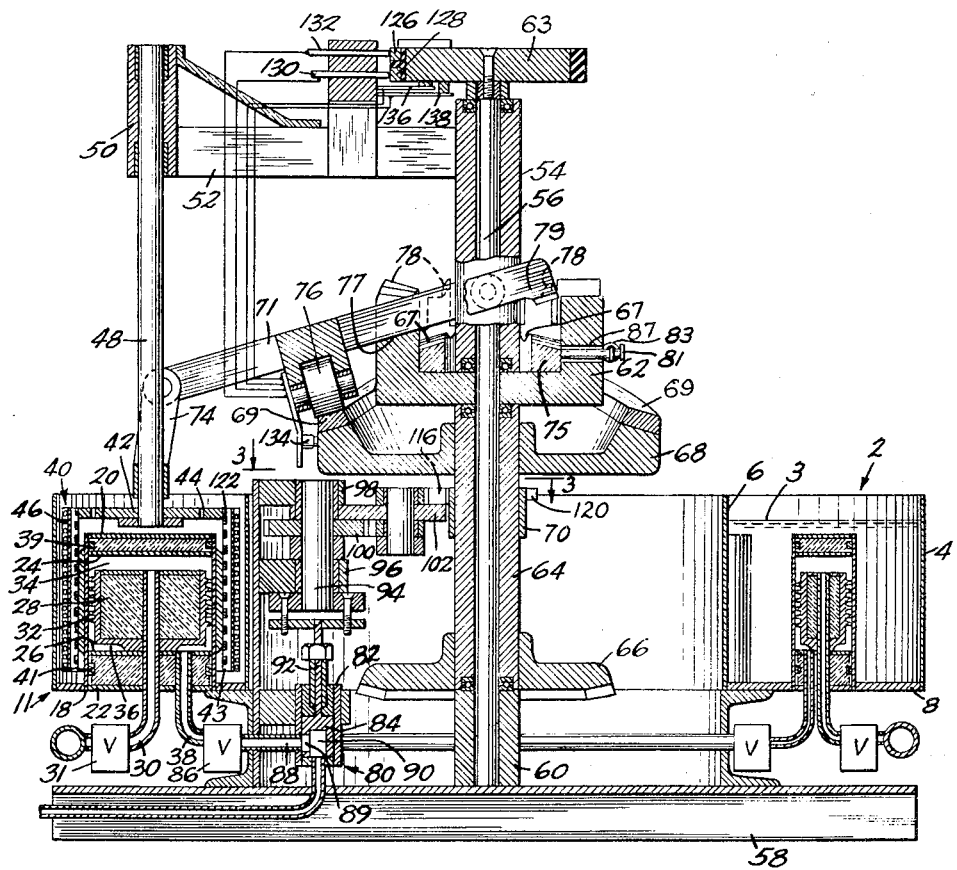
Figure 1 is a vertical section of ice freezing apparatus embodying the invention.

In the present application the term "ice" is at times used in its broader sense as meaning any type of congealed liquid. For example, this term may include all types of water and water-base frozen fluids, such as frozen fruit juices, frozen cream, etc. as well as non-aqueous base frozen fluids. In general, the present application relates to the freezing of thin layers of ice which are of such configuration that they may be fitted at least partially one within another, and these layers are referred to as laminae.

In accordance with the present invention, large pieces of ice are formed by two or more of these laminae, the thickness of the various laminae and the number which are frozen into one piece, as well as the size of the final product, depending upon the many considerations met with in the practice of the invention. The laminae are frozen upon freezing surfaces which are generally annular. The freezing surfaces may be cylindrical with the laminae being formed on an outer surface or on an inner surface. Generally speaking, the laminae are made in what may be termed sets or groups so that small laminae fit within larger ones, and those of each group are nested together to form a larger body of ice. The nesting operation is started either with the smallest lamina of the group which is nested into the next larger or with the largest lamina which is nested over the next smallest. However, with certain applications of the invention, the laminae are formed on a single freezing surface of such configuration that after each lamina is formed, it is moved away from the freezing surface a distance equal to the thickness of the next lamina, thus to provide a layer of liquid to be frozen.

The laminae may be handled individually so that one is moved in nesting relationship with respect to the adjacent one by mechanical action.

The term "harvesting" is used to refer generally to the removal of the ice from the freezing surface, and specifically to the manner in which the adhesion between the ice and the freezing surface is broken. This may be by heating the freezing surface with electrical resistors in contact with the freezing surface or there may be means to cause a flow of electric current through the freezing surface. For example, current may be induced in the freezing walls by setting up an induction field. This latter is referred to as induction heating and may involve a relatively high frequency potential.

Referring particularly to Figures 1 and 2 of the drawings, an annular tank 2 is provided which has an outer wall 4, an inner wall 6 and a bottom wall 8. As shown in the upper left-hand portion of Figure 2, there is a cylindrical ice outlet chute 10 positioned in the tank, the top of which is above the liquid level in the tank; and the tank bottom wall 8 has an opening through which this chute extends so that ice deposited into the chute falls into a storage bin or packaging arrangement (not shown). Evenly spaced around tank 2 with respect to chute 10 and each other are seven cylindrical freezing units 11, 12, 13, 14, 15, 16 and 17. These freezing units are substantially identical in general construction but they are of different diameters, there being a constant difference between the diameter of each freezing unit and the next smaller freezing unit. The general operation is that liquid to be frozen is maintained in tank 2 at a level indicated at 3 in Figure 1 and a cylindrical lamina of ice is frozen on the outer surface of each of the freezing units. The lamina from unit 11 is harvested automatically and it is then nested over the smaller lamina on unit 12. The two laminae are then frozen together, and the cylinder of ice now of double thickness is harvested from unit 12 and nested over the lamina on unit 13. This procedure is repeated so that the laminae from the various units are built up one within the other into a body of ice on unit 17. The body of ice is then released from unit 17 and is deposited in chute 10 for packaging or storage.

The structure of the freezing units is shown best in Figure 1 where at the left unit 11 is shown in section. This unit has a cylindrical freezing shell 18 of magnetic metal having a high core-loss, a top wall 20, a bottom wall 22 and two partitions 24 and 26. Centrally positioned within shell 18 is a spool-like refrigerant-directing core 28 which is spaced from the inner surface of shell 18 and from the top and bottom partitions 24 and 26. Thus, there is a refrigerant chamber 34 formed above the core to which liquid refrigerant is directed by tube 30 from an expansion valve 31, and a refrigerant outlet chamber 36 beneath the core from which the refrigerant gas is withdrawn through a pipe 38 and chambers 34 and 36 are connected by a helical passageway around the core formed by a helical baffle 32 which spans the space between the opposite cylindrical surfaces of the core 28 and the shell. The spaces between wall 20 and partition 24 and between wall 22 and partition 26 and the space within the core are filled by heat-insulating means. In order to limit the formation of ice at the top and bottom of shell 18, there are resistance heater girdle coils 39 and 41 positioned, respectively, adjacent the top and bottom of the shell.

With refrigerant supplied to the unit through pipe 30 and withdrawn through pipe 38, a thin cylinder or cylindrical lamina of ice is formed on the central portion of the outer cylindrical surface of shell 18. This lamina is harvested by an inverted harvesting cup 40 which has a non-magnetic metal inner shell 43 of the proper diameter to nest snugly onto the lamina formed on shell 18. The cup has a top wall 42 which is perforated at 44 to provide for the passage of air when the cup moves onto and from its nesting position. When nested, shell 43 is held in contact with the lamina for a time sufficient to permit the ice to attach itself to shell 43, and then the ice is harvested by inducing a current flow and core loss in shell 18. This current flow is induced by a coil 46 which is wound around and spaced from shell 43, and when alternating current, preferably of a relatively high frequency, passes through this coil, current flows in the wall of shell 18 of sufficient magnitude to heat this shell and release the lamina therefrom. However, shell 43 is of non-magnetic material and there is no substantial current flow through this shell, and the ice continues to adhere thereto so that it may be lifted by raising cup 40. During this harvesting operation, the suction on the refrigerant gas line 38 is cut off so that there is a substantial rise in the refrigerant pressure within the unit, with the result that the harvesting operation takes place rapidly and in an efficient manner.

Cup 40 is rigidly mounted on the lower end of a vertical plunger 48, which is guided at the top in a sleeve bearing 50, carried by a rotatable arm 52. Arm 52 is rigidly mounted on a sleeve 54 which is rotatably mounted on a stationary vertical shaft 56 which projects upwardly from and is supported by the base 58 and a bottom stationary sleeve 60. Shaft 56 also carries a lower rotatable sleeve 64, a center stationary cylindrical cam member 62, and at the top of the shaft is an electric distributor 63. Sleeves 54 and 64 are both carried at their ends by combination radial and thrust ball bearings, and sleeve 64 is rotated counterclockwise at a constant slow speed through a bevel gear 66 keyed thereto and driven by a motor and gear assembly (not shown). At its upper end sleeve 64 has keyed thereto a cup-assembly operating cam 68 having an upper cam surface 69, and beneath this is a refrigerant control cam 70. Sleeve 54 carries a pair of parallel arms 71 and 72 (see also Figure 2), each of which is pivoted to the sleeve by a stud bolt 73 and carries at its outer end a swingable link 74, and these links are pivoted at their lower ends to the opposite sides of plunger 48. Thus, when arms 71 and 72 swing up and down, they carry with them plunger 48 and cup 40, and this movement of the cup assembly and plunger is restricted to a straight vertical movement with respect to the guiding sleeve bearing 50. This vertical movement is transmitted to arms 71 and 72 by the action of cam 68 on a cam follower roller 76 which is carried by arms 71 and 72. That is, as sleeve 64 rotates, cam surface 69 rides under roller 76 and lifts arms 71 and 72 and the cup assembly.

As shown best in Figure 2, member 62 has eight pairs of parallel slots 77; and when arms 71 and 72 are lowered at each of the seven freezing positions and the ice-releasing position at chute 10, these arms fit into a pair of these slots. Thus, the arms are guided vertically so that cup 40 is swung from position to position only when the entire assemblage is elevated. Nested within the central recess of member 62 is a cam ring 75 which has eight cam ridges 73. Each of these ridges presents a cam surface 67 which is engaged by a heel portion 79 on the end of arm 72 when the arm is fully elevated at the respective freezing and ice-releasing positions. Ring 75 carries an outwardly projecting radial pin 81 which extends through a radial slot 87 in member 62 and carries at its projecting end a coil spring 83. The other end of spring 83 is carried by a pin 85 mounted on the side wall of member 62, and spring 83 is tensioned so as to urge ring 75 counterclockwise toward the rest position shown. When so positioned, pin 81 rests against one end wall of slot 87.

Cam ridges 73 are tangential to the outer surface of sleeve 54, and, when the ring is in its rest position shown, they are positioned as shown with respect to the freezing stations and chute 10. Thus, whenever the assemblage is at one of the freezing or ice-releasing positions, heel 79 is in alignment with a cam surface on ring 75 with the ridge of that particular cam surface being disposed clockwise with respect to the heel. Therefore, as arm 72 is raised by the passing of cam surface 69 under cam follower roller 76, heel 79 engages its cam surface 67 on the respective ridge 73 and exerts sufficient pressure to swing ring 75 clockwise within member 62. This movement is against the tension of spring 83, and therefore the ring is in a sense "cocked" so as to exert a force against the heel upwardly and in a direction tending to swing the arm 72 counterclockwise. This cocked condition is reached at the time that roller 76 reaches the crest of the cam surface 69 of cam 68, and at this time arms 71 and 72 have been raised completely out of their slots 77, and the entire assemblage is in the fully elevated position.

The entire assemblage including arm 52 and sleeve bearing 50 is carried by sleeve 54 which is rotatable on shaft 56 and there is a tendency for the cam follower roller 76 to swing the assemblage counterclockwise with cam 68. This tendency is augmented by the force exerted by ring 75 on heel 79 of arm 72 with the result that with the arms raised the entire assemblage swings counterclockwise and levers 71 and 72 are moved out of alignment with the slots 77 from which they were just withdrawn. The top surface of member 62 between slots 77 is formed by a number of cam surfaces 78 and these cam surfaces extend downwardly in a counterclockwise direction from each slot 77 to the next. Thus, as arm 72 is swung counterclockwise out of alignment with the slot 77 from which it has just been withdrawn, the arm moves over a cam surface 78 with the cam surface being disposed downwardly in a counterclockwise direction toward the next slot 77 which is to receive arm 72.

As the assemblage swings counterclockwise, there is a tendency for the assemblage to lag cam 68 and therefore the cam follower roller 76 rolls down the cam surface 69 into a slight dwell in the cam surface and during this movement arm 72 swings down sufficiently to disengage heel 79 from ring 75. Therefore, the ring swings back to its rest position with pin 81 pressing against one end wall of slot 83. The assemblage continues to swing counterclockwise until the arms are directly over the next pair of slots 77 and at this time cup 40 is directly over the next freezing unit. Arm 72 has then been lowered sufficiently to encounter the side wall of its next slot 77 with the result that the counterclockwise movement of the assemblage is stopped. Cam 68 continues to rotate with roller 76 riding over the rear hump of the dwell and thence onto the descending portion of cam surface 69, and this lowers cup 40 onto the freezing unit with the lamina affixed to its inner surface nesting onto the lamina on the freezing unit.

As pointed out above, the refrigerant outlet is cut off just prior to the starting of the energization of coil 46 so that the harvesting operation is completed very rapidly. The cut off of the supply of refrigerant to each freezing unit in this manner is performed by a valve assembly 80 which has a valve casing 82 and a rotor 84 rotatably mounted therein. The refrigerant outlet pipe 38 from each of the freezing units passes through a restrictor 86, such as a valve or an orifice, and a refrigerant pipe 88 and a port 89 into valve 82. These ports are spaced 45° apart around the valve casing and the valve rotor 84 has a downwardly projecting arcuate portion forming a port cover 90 which is adapted to close one of the ports. Therefore, this valve rotor is turned step-by-step so that just prior to the starting of the harvesting operation for a particular freezing unit the port for that unit is closed by the valve rotor. The valve rotor turns one-sixteenth of a revolution at each step so that it closes a port for a short period and then it steps on to an intermediate position for an inactive period, after which it is stepped on to close the next port.

Valve body 84 is rotated through a shaft 92 which is coupled coaxially to a shaft 94 mounted in a pair of bearings 96 and 98. Shaft 94 carries a ratchet wheel 100 and a rockable pawl link 102. Ratchet wheel 100 is keyed to the shaft and the step-by-step movement is transmitted to this wheel by a pawl 104 carried by a shaft 106 on the pawl link and urged into engagement with the ratchet wheel by an adjustable spring 108. The pawl link 102 is urged counterclockwise to the position shown where it engages a stop 109 by a tension spring 110 fixed at one end through a knuckle to shaft 106 and (see Figure 2) fixed at the other end through a knuckle to a shaft 112 carried by a bracket 114 mounted on base 58. Projecting upwardly from the top of pawl link 102 is a cam block 116 which is adapted to be engaged successively by a pair of cam arms 118 and 120 on cam 70. As pointed out above, cam 70 is carried by sleeve 64 and, therefore, as this sleeve rotates counterclockwise from the position shown in Figure 3, cam arm 118 engages the cam block which swings the pawl link clockwise. Pawl 104 is thereby carried so as to gather the next tooth on ratchet wheel 100 and thereafter cam arm 118 moves past cam block 116 so that spring 110 swings the pawl link counterclockwise against an adjustable rod 109 (as shown); the other end of this rod is held in bracket 114. During this counterclockwise movement, pawl 104 turns ratchet wheel 100 and, as pointed out above, this is one-sixteenth of a revolution or 22½°. This movement is transmitted to valve body 84 through shafts 94 and 92 with the result that the port is closed for the freezing unit to be harvested, and the harvesting operation for that unit is then carried on. Upon further turning of cam 70, cam arm 120 engages cam block 116 with the result that the ratchet wheel is advanced another step and this turns the valve body so as to uncover the valve port.

The harvesting operation is carried on in the manner outlined above so that the laminæ are built up within cup 40 until the smallest lamina from freezing unit 17 is in place. Upon the completion of the harvesting operation at unit 17 the harvesting cup assembly moves to a stop directly over chute 10 and the cup is moved down into the top of this chute. At this time a resistance heating coil 122 which is on the outer surface of shell 43 is then energized. This resistance unit is electrically insulated from the shell but it is in good heat-transfer relationship so that the shell is heated rapidly. Therefore, the body of ice composed of the laminæ frozen together is freed from the cup and drops down chute 10. The rotation of cam 70 continues during the entire operation and valve 80 is operated, but there is no port 89 in casing 82 in the zone covered by the valve body during the time that cup 40 is positioned in chute 10. When cam 68 completes the next revolution cup 40 is moved into nesting relationship with respect to freezing unit 11 and the cycle is repeated.

The electrical circuits for energizing heater elements 122 and coil 46 are not shown in full. However, distributor 63 on the top of shaft 56 has on its cylindrical surface a contactor ring 126 and a contactor ring segment 128, and when cup 40 is positioned to be nested over one of the freezing units, these segments are engaged respectively by a pair of brushes 130 and 132. These segments are connected to a source of relatively high frequency potential and the brushes are connected through wires and a series microswitch 134 on arms 71 and 72 to coil 46. A similar circuit is provided for heater element 122, there being a pair of brushes 136 and 138 which engage a pair of segments on the commutator when cup 40 is positioned to enter chute 10. These commutator segments are connected to a source of alternating current and these brushes are connected through wires and a microswitch (not shown) to the heater element. The microswitches are closed by engagement with the end of cam 68 when arms 72 are in their lower position, and as the cam continues to rotate these switches are reopened.

As pointed out above, there are girdle coils 79 and 41 embedded in insulation at the two ends of the ice forming zone of each of the freezing units. These girdle coils supply heat continuously so as to limit the extent of the formation of ice on the shell surfaces, and this also determines the contour of the ends of the laminæ of ice. That is, by controlling the various factors including the rate of freezing and the amount of heat supplied by the girdle coils, the end surfaces of the laminæ may be varied between a long taper on the outer surface and a substantially flat annular end surface. During the formation of a lamina, the first film of ice formed is substantially coextensive with the inner surface of shell 18 which is exposed to refrigerant. As freezing continues, however, so that the lamina of ice becomes thicker, there is a tendency for the ice to creep up and down on the shell so as to increase the length of the lamina. The girdle coils supply heat to compensate for heat leakage through the insulation so as to minimize or completely prevent this tendency for the lamina to be extended in length. By supplying a large amount of heat the lamina may be caused to build up as a substantially true cylinder with flat end surfaces, and by supplying a very small amount of heat a very long taper may be formed. In the present embodiment a taper is provided which is sufficient to assist in guiding cup 40 and the laminæ into nested position as the cup moves downwardly onto the various freezing units. In the design of the machine the length of taper is influenced by positioning the girdle coils a greater or lesser distance along the freezing wall from the edge of the refrigerant space.

As many possible embodiments may be made of the mechanical features of the above invention and as the art herein described might be varied in various parts, all without departing from the scope of the invention, it is to be understood that all matter hereinabove set forth, or shown in the accompanying drawings is to be interpreted as illustrative and not in a limiting sense.

This application is a division of Serial No. 693,994 filed August 30, 1946.

I claim:

1. In ice-making apparatus, a plurality of individual freezing units presenting freezing surfaces upon which cylindrical bodies of ice of different diameters are formed, a harvesting element adapted to have ice frozen thereto, means to move said harvesting element to and from said freezing units successively in accordance with the sizes of the respective bodies of ice, and means to harvest each body of ice from its freezing surface after it has been frozen to the harvesting element.

2. In ice-making apparatus, the combination of, means forming a tank for liquid to be frozen, a plurality of freezing units of varying diameters positioned in said tank and presenting outwardly exposed cylindrical freezing surfaces upon which cylindrical laminae of ice form during the freezing operation with the laminae being of such relative diameters that they nest one within another, and harvesting mechanism including a harvesting unit and means to move the unit to the largest lamina of ice so that said largest lamina is frozen thereto and thereafter is released from its freezing surface and to then nest said largest lamina over the next smaller lamina.

3. In ice-making apparatus, a harvesting unit comprising, an inverted cup having a cylindrical wall of non-magnetic material having an inner cylindrical surface to which a cylinder of ice is adapted to be frozen after being formed on a cylindrical freezing surface, an induction coil surrounding said cylindrical wall and adapted upon energization to free the ice from the freezing surface, a resistance heater in heat-exchange relationship with respect to said inner cylindrical surface and adapted to free the ice therefrom, and electrical means to control selectively the energization of said induction coil and said resistance heater.

4. In ice-making apparatus, the combination of, means forming an annular space to receive liquid to be congealed, a plurality of ice-forming units positioned within said space and presenting individual freezing surfaces which are so shaped that laminae formed thereon will nest together, and a harvesting assembly including a harvesting element and means to move said element step-by-step around said harvesting space and gather and nest together the laminae from the respective ice-forming units.

5. In a harvesting unit for ice-making apparatus, an inverted cup adapted to nest over laminae of ice at various freezing stations and to have the laminae frozen thereto and then freed from their respective freezing surfaces, and means to move said inverted cup step-by-step around a vertical axis comprising a pair of arms pivoted to swing horizontally, on a sleeve which is adapted to turn around said vertical axis, a first cam member which is rotated about said vertical axis, a cam follower carried by said arms and adapted to engage a cam surface on said cam member to impart to said arms said swinging movement, a second cam member presenting guiding surfaces which guide said arms in their downward movement so as to direct said inverted cup to various freezing stations, a third cam member, and means associated with said third cam member to impart to said arms turning movement about said vertical axis whenever said inverted cup is raised from each freezing station.

6. Apparatus as described in claim 5, which includes, a fourth cam member, and means operated by said fourth cam member to stop the freezing operation at each freezing station at the time the inverted cup is positioned at that freezing station.

CROSBY FIELD.

No references cited.